US012390401B1

(12) United States Patent
Steyn

(10) Patent No.: US 12,390,401 B1
(45) Date of Patent: Aug. 19, 2025

(54) DOSING LABELS FOR ELECTRONIC MEDICATION CONTAINER CAPS

(71) Applicant: Verily Life Sciences LLC, South San Francisco, CA (US)

(72) Inventor: Jasper Lodewyk Steyn, San Bruno, CA (US)

(73) Assignee: Verily Life Sciences LLC, Dallas, TX (US)

( * ) Notice: Subject to any disclaimer, the term of this patent is extended or adjusted under 35 U.S.C. 154(b) by 69 days.

(21) Appl. No.: 17/406,979

(22) Filed: Aug. 19, 2021

Related U.S. Application Data

(60) Provisional application No. 62/706,498, filed on Aug. 20, 2020.

(51) Int. Cl.
*G08B 23/00* (2006.01)
*A61J 1/03* (2023.01)
*A61J 7/04* (2006.01)

(52) U.S. Cl.
CPC ............... *A61J 7/0436* (2015.05); *A61J 1/03* (2013.01); *A61J 7/0472* (2013.01); *A61J 2200/70* (2013.01); *A61J 2205/30* (2013.01)

(58) Field of Classification Search
CPC .......... A61J 7/0436; A61J 1/03; A61J 7/0472; A61J 2200/70; A61J 2205/30
USPC .......................................................... 340/500
See application file for complete search history.

(56) References Cited

U.S. PATENT DOCUMENTS

| | | | | |
|---|---|---|---|---|
| 5,313,439 A | | 5/1994 | Albeck | |
| 5,751,576 A | * | 5/1998 | Monson | A01B 79/005 239/161 |
| 6,084,504 A | | 7/2000 | Rosche et al. | |
| 8,391,104 B2 | | 3/2013 | De | |
| 8,842,501 B2 | * | 9/2014 | Ziemba | A61J 7/0436 368/109 |
| 9,361,780 B2 | * | 6/2016 | Burke, Jr. | G08B 21/24 |
| 9,588,496 B2 | * | 3/2017 | Kodat | G04G 15/006 |
| 10,039,231 B2 | * | 8/2018 | Anderson | G01B 21/08 |
| 12,083,069 B1 | | 9/2024 | Steyn et al. | |
| 2003/0198134 A1 | * | 10/2003 | Hildebrandt | A61J 7/0481 368/10 |

(Continued)

OTHER PUBLICATIONS

U.S. Appl. No. 17/406,952 , "Notice of Allowance", Apr. 22, 2024, 13 pages.

*Primary Examiner* — Tai T Nguyen

(74) *Attorney, Agent, or Firm* — Kilpatrick Townsend & Stockton LLP

(57) ABSTRACT

One example medication container includes a storage portion enclosing a volume to store medication and having an opening providing access to the volume, a cap configured to releasably couple to and seal the storage portion, the cap including one or more visual indicators; a sensor; and an electronic timer, wherein the sensor is configured to output a signal in response to detecting that the cap is decoupled from the storage portion; and the timer is configured to reset based on the signal and to output one or more signals to activate the one or more visual indicators based on an elapsed time since a most recent resetting of the timer and one or more thresholds; and a label affixed to the cap, the label having one or more markers, the one or more markers corresponding to the one or more visual indicators, the markers indicating dosing times associated with a medication.

25 Claims, 10 Drawing Sheets

(56) References Cited

U.S. PATENT DOCUMENTS

| | | | | |
|---|---|---|---|---|
| 2008/0117719 | A1 | 5/2008 | Hildebrandt | |
| 2009/0294521 | A1* | 12/2009 | de la Huerga | A61J 1/035<br>235/375 |
| 2013/0021878 | A1* | 1/2013 | Harris | G04F 1/005<br>368/10 |
| 2015/0095047 | A1 | 4/2015 | Burrows et al. | |
| 2015/0302305 | A1* | 10/2015 | Rupp | G06N 7/06<br>706/46 |
| 2016/0086750 | A1 | 3/2016 | Loewen | |
| 2017/0239146 | A1* | 8/2017 | Bomhoff | A61J 7/0076 |
| 2018/0280246 | A1* | 10/2018 | Cohen | A61J 7/0481 |
| 2019/0278234 | A1 | 9/2019 | Tsuchiya | |
| 2021/0030625 | A1* | 2/2021 | Houghton | A61J 7/0436 |
| 2021/0382295 | A1 | 12/2021 | Booker | |
| 2024/0423872 | A1 | 12/2024 | Steyn et al. | |

* cited by examiner

DOSING LABELS FOR ELECTRONIC MEDICATION CONTAINER CAPS

CROSS-REFERENCE TO RELATED APPLICATIONS

The present application claims the benefit of U.S. Provisional Patent Application No. 62/706,498, filed Aug. 20, 2020, the entirety of which is hereby incorporated by reference, and is related to U.S. Provisional Patent Application No. 62/706,499, filed Aug. 20, 2020, titled "Switches for Medication Container Caps," and U.S. patent application Ser. No. 17/406,952, titled "Switches for Medication Container Caps," filed concurrently herewith.

FIELD

The present application generally relates to medication containers and more particular relates to dosing labels for electronic medication container caps.

BACKGROUND

Medications, such as pills, are distributed to consumers in a variety of different forms. For example, pills may be inserted into sheets of blister packs with plastic or foil backing. When a person wishes to use a pill, she can tear one of the blister packs from the sheet and remove the backing to remove the pill. In other cases, medication such as capsules or pills may be dispensed into a bottle with a twist or screw top. The person can then unscrew the top from the bottle, remove a dose of the medication, and then screw the top back onto the bottle to re-seal the contents within the bottle.

SUMMARY

Various examples are described for dosing labels for electronic medication container caps. One example medication container includes a storage portion enclosing a volume to store medication and having an opening providing access to the volume, a cap configured to releasably couple to and seal the storage portion, the cap comprising: one or more visual indicators; a sensor; and an electronic timer, wherein: the sensor is configured to output a signal in response to detecting that the cap is decoupled from the storage portion; and the timer is configured to reset based on the signal and to output one or more signals to activate the one or more visual indicators based on an elapsed time since a most recent resetting of the timer and one or more thresholds; and a label affixed to the cap, the label comprising one or more markers, the one or more markers corresponding to the one or more visual indicators, the markers indicating dosing times associated with a medication.

One example cap for a medication container includes one or more visual indicators; a sensor; and an electronic timer, wherein: the sensor is configured to detect the cap decoupling from a storage portion and to transmit a signal to the electronic timer, and the timer is configured to reset based on the signal and to output a signal to activate the one or more visual indicator based on an elapsed time since a most recent resetting of the timer and one or more thresholds; and a label affixed to the cap, the label comprising one or more indicators, a first indicator of the one or more indicators aligned with a first light of the one or more lights to indicate a medication dosing time.

One example method of dispensing medication includes obtaining a storage portion of a medication container, the storage portion enclosing a volume to store medication and having an opening providing access to the volume; dispensing a quantity of medication tablets into the storage portion; coupling a cap to the storage portion to seal the storage portion, the cap comprising: one or more visual indicators; a sensor; and a timer configured to output one or more signals to activate the one or more lights based on an elapsed time since a most recent resetting of the timer and one or more thresholds; the sensor configured to output a signal in response to detecting the cap is decoupled from the storage portion, the timer further configured to reset based on the signal; aligning one or more alignment slots on a label with corresponding one or more alignment tabs on the cap, the label having one or more markers; and affixing the label on the cap.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more examples and, together with the description of the example, serve to explain the principles and implementations of the certain examples.

DETAILED DESCRIPTION

Figure 1A:
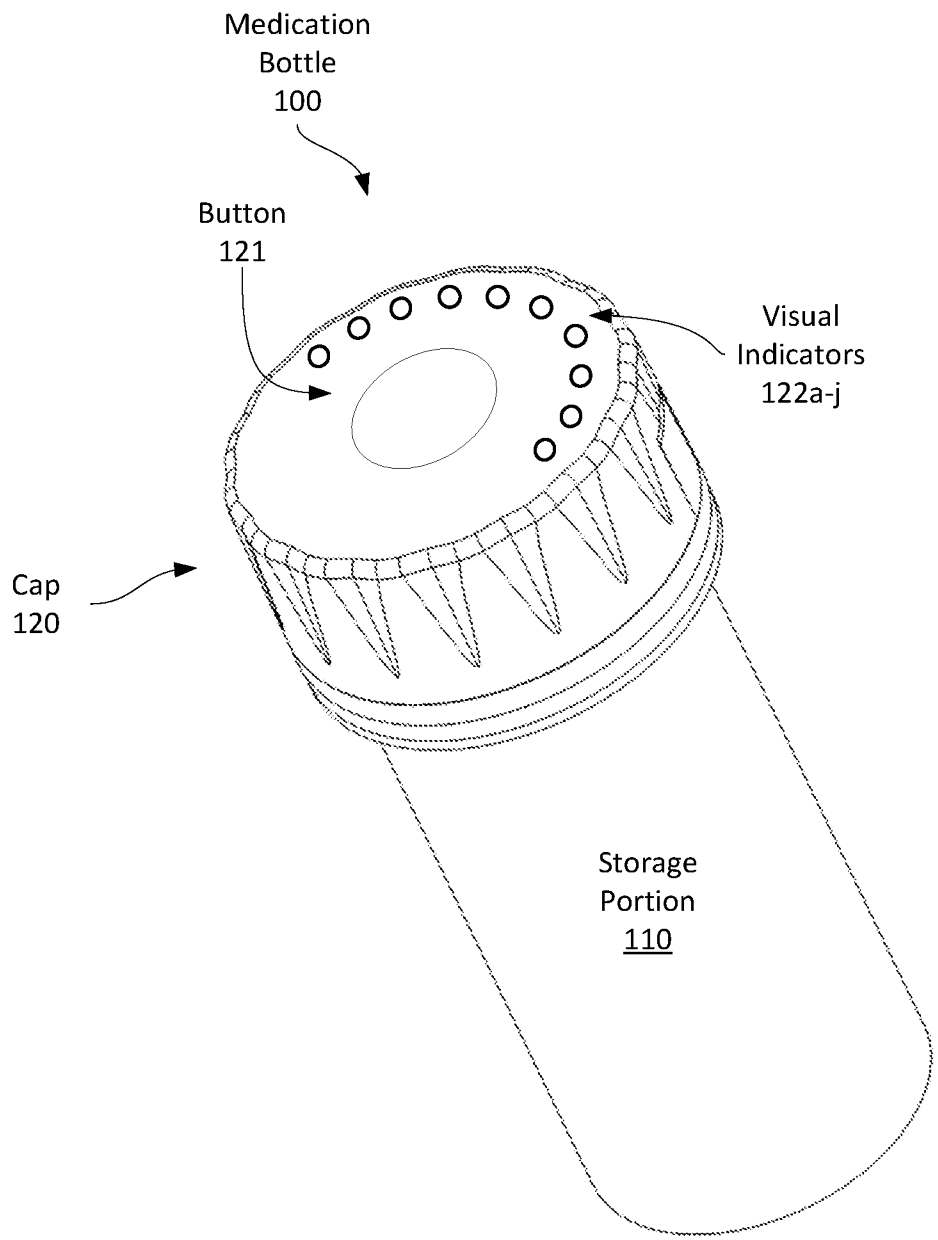
FIG. 1A shows an example medication container with a cap.

Examples are described herein in the context of dosing labels for electronic medication container caps. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Medication, such as in the form of individual pills, capsules, tablets, etc. (collectively referred to as "tablets" in this disclosure), provided to consumers is often provided in bottles with re-sealable caps. Many of these have threads to allow them to be screwed into place, but others may be held in place by an interference fit and popped off (or re-sealed) by applying enough force. In many cases, such containers are used to store medication that is to be taken on a regular dosing schedule, e.g., 1 tablet every 12 hours. Thus, approximately every 12 hours, the person will remove the cap from the container, remove the appropriate dose of the medication, and then close the container using the cap. However, for these kinds of medication, people may forget if they have taken a particular dose of medication ("did I take a tablet with breakfast?") or they may forget how long it has been since they took a dose ("did I take a tablet at noon or at 2 pm?").

To help alleviate this problem, example medication container caps according to this disclosure include visual indicators in conjunction with a label having markings corresponding to the visual indicators. In this example, the cap has multiple light emitting diodes ("LEDs") in it and the label has corresponding markings on it, each indicating an amount of time since the medication bottle was last opened. For example, the label may have markings in two-hour increments, e.g., "2 HR," 4 HR," etc. In addition, the label has markings indicating the prescribed dosing interval. In this example, a black bar is positioned adjacent to the "8 HR" indicator to indicate that a dose should be taken when the 8 HR indicator is lit.

Using such a medication container cap, dosing information may be interactively provided to the person when needed. When obtaining a new bottle of medication, the pharmacist can generate a label for the medication container cap with the timing markings on it, but also the correct dose marking(s) to indicate when a dose should be taken. This can help the person in at least two ways. First, the person can be told how long it has been since they last opened the bottle, which can serve as a proxy for the time medication was last taken. Second, the person can be told whether they should take another dose or not. If a person takes multiple medications, they may easily misremember the dosing intervals for the different medications. While such information may be provided on the side label, by providing the dose time juxtaposed with a light or other visual indicator indicating the time since the last dose was taken can help the person easily determine at a glance whether it is time to take a dose of medication or not.

To help provide the visual indicators, example medication container caps can include a timer (or microprocessor/microcontroller/etc. implementing timing functionality) and one or more switches to control the timer. The switches are toggled when the cap is removed and then again when the cap is replaced on the container, thereby resetting the timer. The timer or a button on the cap can then be used to illuminate one or more lights on the medication container cap.

To enable this functionality, a small, circular printed circuit board ("PCB") has an electronic chip with a timer, along with a battery to run the chip. In this illustrative example, the PCB also has three switches attached to it that close when the medication container cap is removed from the container. When the switches close, the chip receives an electrical signal to indicate that the medication container cap has been removed, at which time the chip resets the timer. Later, when the medication container cap is replaced on the container, the switches open and the chip lets the timer start running from 0. At a later time, if a person is unsure about how long it has been since they have taken a dose of medication, they can press a button on the top of the cap. The cap sends a signal to the timer, which then causes the timer to activate one or more of the visual indicators. The person can then view markings on the label to determine whether it is time to take a dose of medication or not.

This illustrative example is given to introduce the reader to the general subject matter discussed herein and the disclosure is not limited to this example. The following sections describe various additional non-limiting examples and examples of dosing labels for electronic medication container caps.

Referring now to FIG. 1A, FIG. 1A shows an example medication container. In this example, the medication container is a medication bottle 100 that includes a storage portion 110 and a cap 120. In this example, the cap 120 and the storage portion 110 are threaded to enable the cap 120 to be screwed onto the storage portion 110 to seal the storage portion 110 and to be screwed off of the storage portion 110 to enable access to medication stored in the medication bottle 100.

In this example, the cap 120 and the storage portion 110 can be releasably coupled via the threaded portions on each; however, other types of sealing techniques may be used. For example, the storage portion 110 may have an opening with a lip. The cap 120 may be pressed down and over the lip to engage with the lip, thereby sealing the storage portion 110. The cap 120 may later be pried or otherwise released from the lip to open the medication bottle. In some examples the cap may be coupled to the storage portion by a hinge and one or more tabs. By releasing the tabs, the cap may hinge away from the storage portion to unseal the storage portion and enable access to medication within the medication container. Re-sealing the container may then involve pressing the cap back against the tabs to re-engage the tabs to hold the cap in place. Still other releasable coupling techniques may be used to allow the cap 120 to seal the storage portion 110.

In this example, the cap 120 provides an air-tight seal of the storage portion 110 to prevent introduction of contaminants or fluids into the storage portion, which may degrade or otherwise damage the medication stored within the medication bottle 100. However, sealing the storage portion 110 does not require such a seal. Instead, sealing the storage portion 110 involves sufficiently closing the storage portion so as to prevent medication from falling out of the storage portion while the cap 120 is in place. Thus, a cap 120 may seal the storage portion without an air-tight seal or another seal to prevent in the ingress contaminants, liquids, or other foreign material.

While this example medication bottle 100 has a cylindrical shape, such a shape is not required. For example, the storage portion 110 may have any suitable shape, such as rectangular, etc. Similarly the cap 120 may have any suitable shape, and the cap 120 and the storage portion 110 need not have the same shape so long as the cap 120 can be releasably coupled to the storage portion 110 to seal the storage portion 110 as discussed above.

As shown in FIG. 1A, the cap 120 also includes a button 121 and several visual indicators 122*a-j*. The button 121 may be pressed to activate one or more visual indicators corresponding to an elapsed time since the cap 120 was last removed from the storage portion 110. The button 121 may be employed to only activate the visual indicators 122*a-j* when the person needs to see them, though the button 121 may be omitted in some examples and the visual indicators 122*a-j* may be activated when the corresponding amount of time has elapsed. When activated, the visual indicators 122*a-j* indicate to the person that a predetermined amount of time has elapsed since the last time the cap 120 was removed from the storage portion 110, and thus may serve as a proxy for determining the amount of time since the person has taken a dose of medication.

In this example, the visual indicators 122*a-j* are LEDs, but any suitable visual indicator may be employed. For example, the visual indicator may be a liquid-crystal display (LCD), and organic LED (OLED) display, ane-Ink display or any other type of information display showing the amount of elapsed time since the cap was last removed from the storage portion. An LCD may be able to display multiple segments to be able to show the time elapsed since the cap as last removed from the storage portion. Alternatively, there may be any number of multiple visual indicators. In the example shown in FIGS. 1A, ten visual indicators 122*a-j* are provided, with each LED indicating a period of time has elapsed. The first indicator 122*a* indicates that less than two hours have elapsed since the last time the cap 120 was removed from the storage portion 110. The second indicator 122*b* indicates two hours have elapsed, then four hours 122*c*, then 8 hours 122*d*, and so forth (refer to FIG. 1E for the labeled time increments). Still other configurations may be employed according to different examples.

It should be appreciated that in some examples, visual indicators 122*a-d* may be omitted. Instead, in some examples, the timer 180 may include a microprocessor (or microcontroller, FPGA, etc.) and the PCB may further include a wireless transmitter or transceiver 182. When the switches 140*a-c* change states, the microprocessor 180 may store the state changes to indicate when the cap 120 is removed from the storage portion 110. At a later time, when the person presses the button 121, the microprocessor 180 may then wirelessly transmit, e.g., via Bluetooth or Bluetooth low-energy ("BLE"), the stored information to another device, such as the person's smartphone, which may then display historical information about the bottle being opened and closed or it may display information indicating the last time the bottle was opened. Thus, while visual indicators 122*a-d* may be omitted from the cap 120, the cap 120 may still be able to provide information to the person to indicate the elapsed time since the last time the bottle was opened. Further, in some examples, rather than resetting the timer 180, the switches may simply indicate the bottle-opening and bottle-closing events, which the timer 180 (or microprocessor) can store.

Figure 1B:
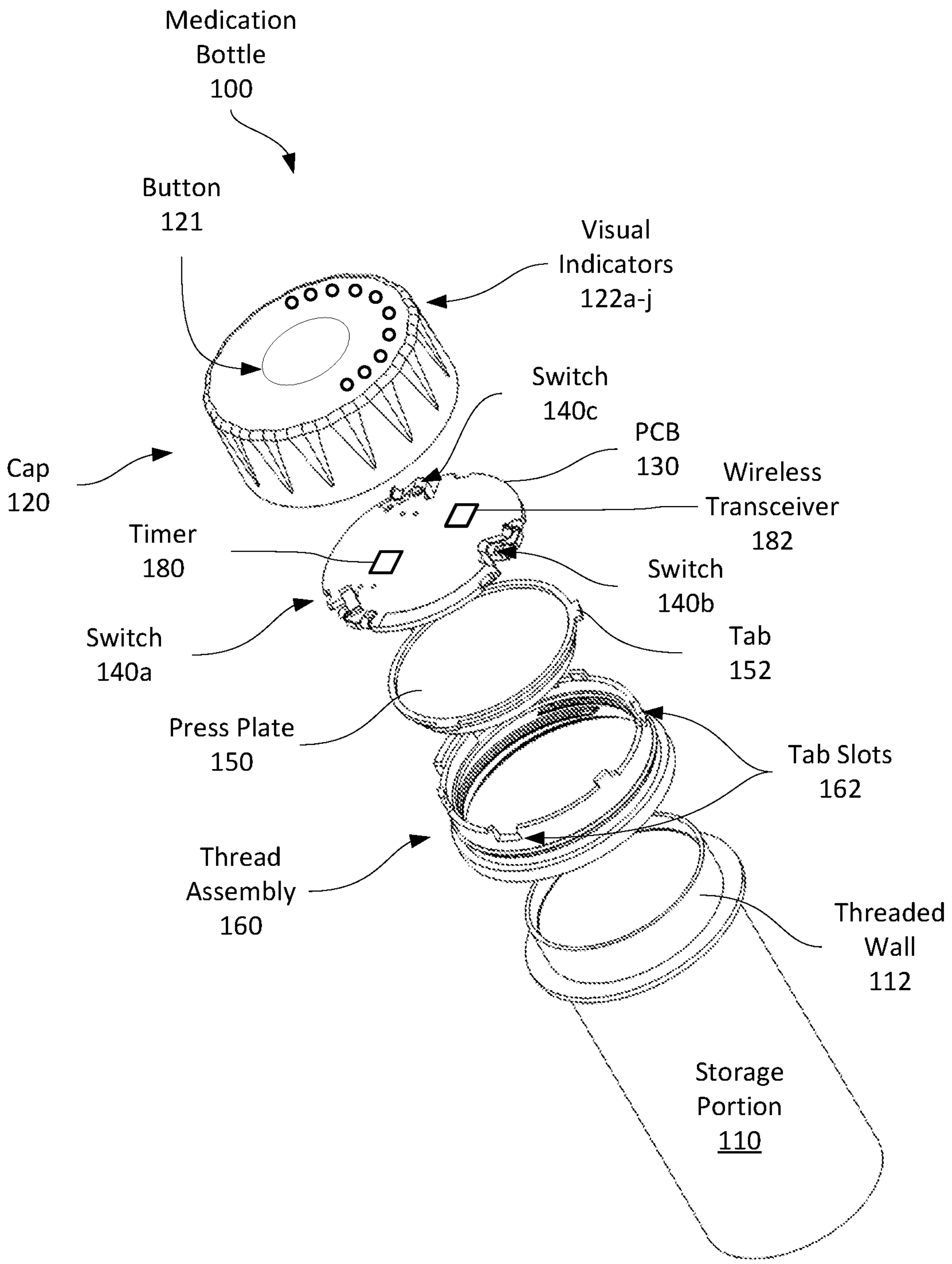
FIG. 1B shows an exploded view of the medication container of FIG. 1A.

Referring now to FIG. 1B, FIG. 1B shows an exploded view of the medication bottle 100 of FIG. 1A. As can be seen, the cap 120 includes several components in addition to the thread assembly 160 used to secure the cap 120 to the storage portion 110 as discussed above. In this example, the cap 120 includes a PCB 130 that has a timer 180 and three switches 140*a-c* coupled to it. A press plate 150 is positioned between the PCB 130 and the thread assembly 160, with tabs 152 on the press plate 150 engaging with tab slots 162 on the thread assembly 160 to maintain the relative positioning of the components. When assembled, the PCB 130 and press plate are positioned within the cap 120. The thread assembly 160 may be press-fit into the cap 120 or may screw into the cap 120 depending on the particular implementation. In some examples, the cap 120 may be disassembled, such as to replace a battery, while in other examples, the components may be permanently affixed to the cap 120, such as with an epoxy, other adhesive or by engagement of mechanical tabs or other features.

When assembled, and as will be described in more detail below, the PCB 130 and the thread assembly 160 are fixedly seated within the cap 120, while the press plate 150 is free to move within the tab slots 162 with respect to both the PCB 130 and thread assembly 160. It should be appreciated that in some examples, the press plate 150 may be fixedly coupled to the threaded portion 160 and the PCB 130 may be allowed to move within one or more tab slots in the threaded portion 160 or the cap 120. Alternatively, in some examples, the PCB 130 may be positioned between the press plate 150 and the threaded portion 160. In such a configuration, the press plate 150 may be fixed in place while the PCB 130 may be free to move much as the press plate 150 is able to move in the example shown in FIG. 1B. Thus, the PCB 130 may be pressed against the press plate 150 when the cap 120 is coupled to the storage portion of the medication bottle 100.

When the cap 120 is decoupled from the storage portion 110, the press plate 150 is pressed away from the PCB by flexible members in the switches 140*a-c*, thereby closing each the switches 140*a-c*, which will be described in more detail below. However, when the cap 120 is screwed into place onto the storage portion 110, the threaded wall 112 presses against the press plate 150, which is in turn pressed against the switches 140*a-c*, opening each of them. Thus, by opening and closing the medication bottle 100, the switches 140*a-c* within the cap may be opened and closed. While switches 140*a-c* shown in FIG. 1B are used in this example, any suitable sensor to detect the decoupling of the cap 120 from the storage portion 110 may be used. For example, suitable sensors may include mechanical switches, electrical or electronic switches, optical sensors, magnetic sensors, ultrasonic sensors, pressure transducers, etc. that can detect when the cap 120 is removed from or coupled to the storage portion 110.

Figure 1C:
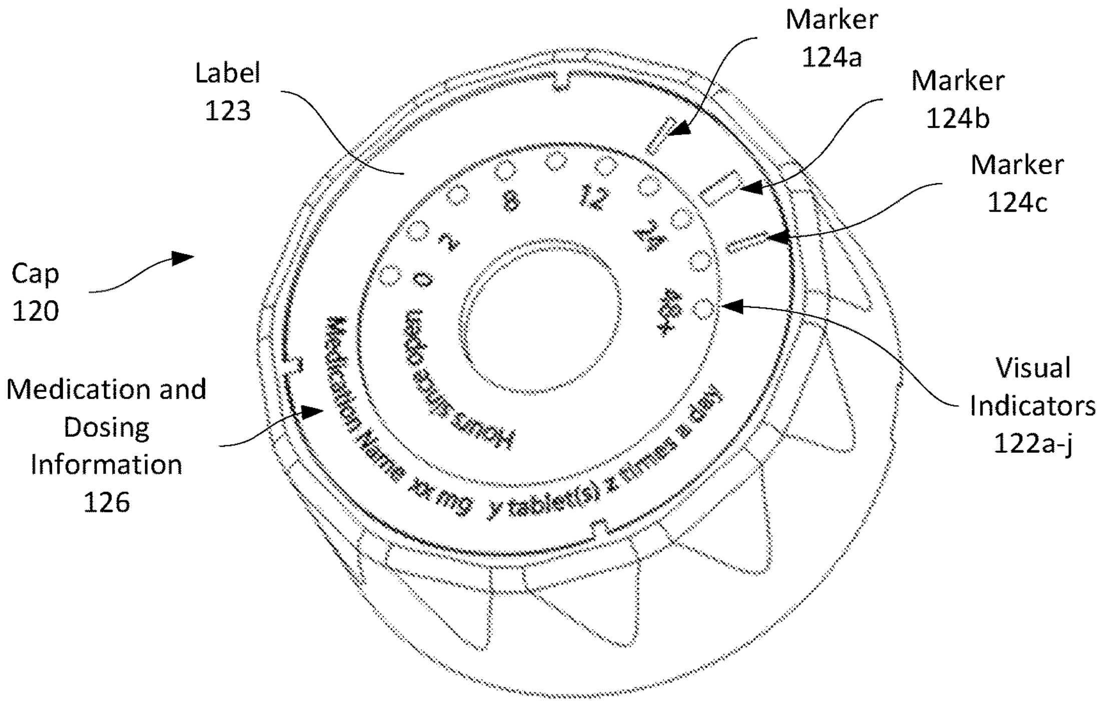
FIGS. 1C-1D show example dosing labels for electronic medication caps.
Figure 1D:
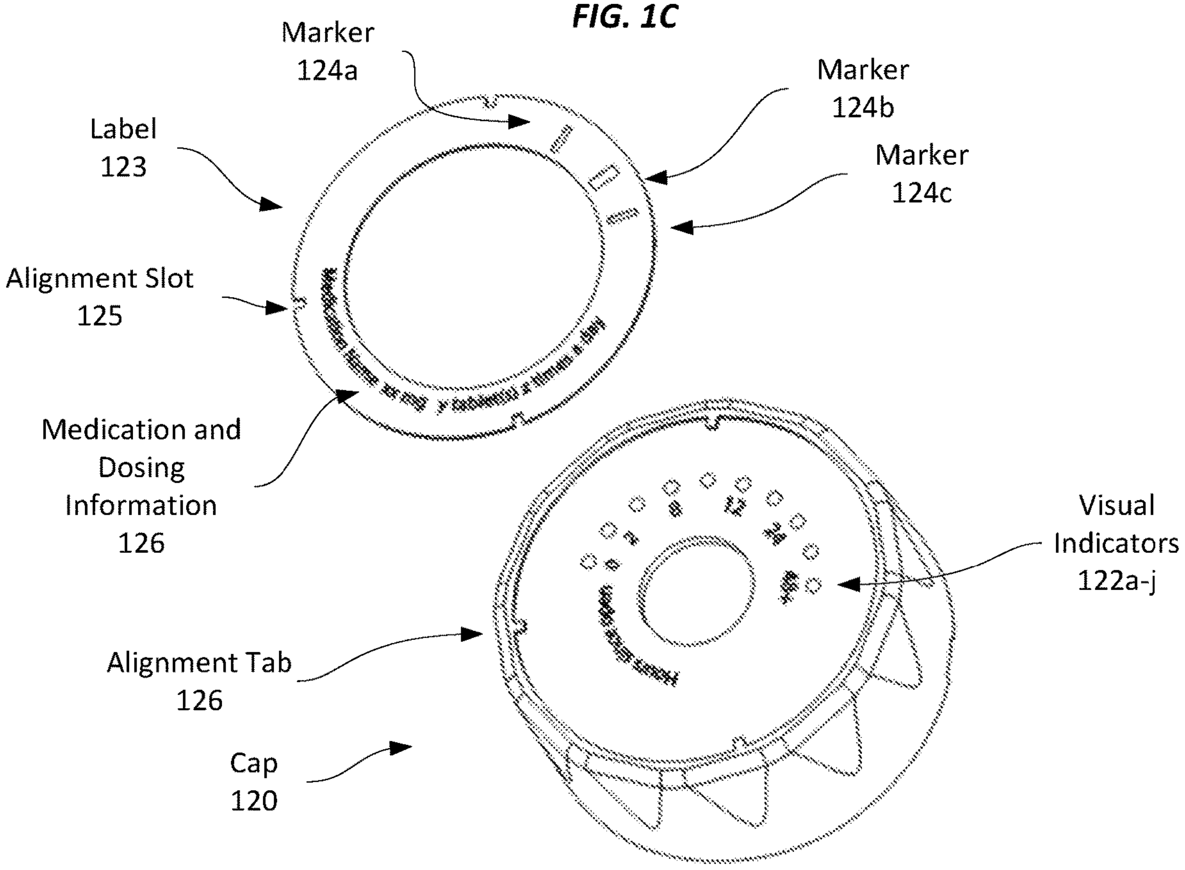

Referring now to FIGS. 1C and 1D, FIG. 1C shows the medication container cap 120 with an applied label 123. In this example, the cap 120 has both LEDs 122*a-j* and markings identifying visual indicators 122*a-j* and the corresponding the number of hours since the cap was last opened; however in some examples, such markings may be provided on the label 123 itself.

The label 123 is constructed of a suitable material, such as paper or plastic, that can have information printed on it, such as by a laser or ink jet printer. One side of the label 123 is depicted as having medication and dosing information 126 printed on it, while the other side of the label 123 has an adhesive applied to it, such as any suitable pressure-sensitive adhesive ("PSA"). In this example, the label is one of many formed of a single sheet of material, such as a sheet of paper or a plastic decal material on a backing sheet, that is pre-cut or perforated to allow individual labels to be extracted from the sheet. Such a configuration may allow the label 123 to be run through a printer to have medication or dosing information printed on it before it is separated and applied to the cap 120. Further, while the label 123 in this example is circular, labels may be any suitable shape based on the size or shape of the cap of a medication container.

The label 123 is depicted separate from the cap 120 in FIG. 1D and provides information about medication within the medication bottle 100 and the dosing regimen, e.g., the number of tablets and how often to take them. In addition, the label 123 has three markers 124*a-c* printed on it, though in some examples, the markers 124*a-c* may be defined as holes or slots within the label 123. The markers 124*a-c* indicate a proper dosing time for the medication within the medication bottle 100. Marker 124*b* identifies the prescribed dose time, e.g., 24 hours in this example, while markers 124*a* and 124*c* provide indications of a dosing "window" during which the person may take the dose of medication and still comply with the prescription's dose timing. Depending on the timer 130 within the cap 120, markers 124*a* and 124*c* may indicate a number of minutes or hours before (or after) the ideal dosing time at marker 124*b*.

In this example, marker 124*b* indicates that another dose should be taken 24 hours after the last dose. Thus when the visual indicator corresponding to marker 124*b* is activated, it indicates to the person that it is time to take another dose. However, marker 124*a* corresponds to a visual indicator that activates after 23 hours. Thus, the person knows that it is almost time to take a dose when the visual indicator corresponding to marker 124*a* activates. Similarly, the visual indicator corresponding to marker 124*c* activates after 28 hours have elapsed, indicating that the person may have missed the dose and, depending on the medication, should either take another dose immediately or skip the dose and wait until the next dose should be taken. By using such dosing windows, the person may be given some indication when they are within an appropriate dosage time and should take a dose of medication. It should be appreciated, however, that markers 124*a* and 124*c* may be omitted in some examples and only an marker 124*b* indicating the exact dosing time may be used, or visual marker 124*b* may be omitted and only the dosing window may be provided instead.

In addition to the markers 124*a-c*, the label 123 has one or more alignment features, e.g., alignment slots 125, that engage with corresponding alignment features, e.g., alignment tabs 126, formed on the cap 120. These alignment features help to ensure that the markers 124*a-c* align with the correct visual indicators 122*a-j* and thus provide accurate dosing information. In this example, while the alignment slots 125 are defined on the outer perimeter of the label 123, they may be formed on the inner perimeter or as holes within the interior of the label itself. Corresponding tabs 126 may be formed on the cap 120 to engage with the slots. While this example employs alignment tabs and corresponding alignment slots, other alignment features may be employed in some examples. Such alignment features may enable visual alignment features, such as embossed letters, numbers, or symbols, or mechanical alignment features, such as the tabs 126 and slots 125 shown in FIGS. 1C-1D. Any suitable alignment features may be used according to different examples.

In some examples, a single type of cap may be used with any number of different types of labels. For example, a cap that provides visual indicators corresponding to common dosing intervals, e.g., 4 hours, 6 hours, 8 hours, 12 hours, and 24 hours, may be used for most medications used by various members of the population. However, by using a label with a set of markers defined according to a specific prescription, the cap may be customized to correspond to medication for a specific individual. For example, one person may be prescribed a medication that is taken every 12 hours. Thus a corresponding label with 12-hour dosing markers may be created and applied to the cap. However, a different person may be prescribed a medication that is taken every 8 hours. A different label with 8-hour dosing markers may be created and applied to another cap. However, since the caps each support 8- and 12-hour dosing schedules, a pharmacy or other health care provider may only need to stock a single type of cap, while custom-generating appropriate labels when a prescription is filled.

However, in some examples, different types of caps may be needed. For example, caps may be designed with non-standard dosing intervals or for specific types of medication. In such cases, alignment features may be used to ensure that the labels are only used with the corresponding caps. For example, the use of different alignment features in different locations may ensure compatibility between caps and labels. For example, one version of a cap 120, such as depicted in FIGS. 1C and 1D provides visual indicators 122*a-j* running from 0 to 48+ hours. However, in some cases, caps may have different numbers of visual indicators or visual indicators with different timings associated with them. This then corresponds to different programming within the cap's timer. A timer for one type of cap may activate visual indicators on one schedule, while a timer for a different type of cap may activate visual indicators on a different schedule. Thus, a label designed to indicate an eight-hour dosing regimen on one cap may align with an incorrect visual indicator on a second cap if the second caps visual indicators reflect different timings. Using different configurations of alignment slots may help to ensure that a label is affixed only to a compatible caps. Such a technique may also obviate the need to provide custom programming for timers or timers with different selectable timing configurations. Instead, different timers with fixed timing schedules may be assigned to different types of caps while still enabling application of the correct label by a pharmacist or other medical professional.

Figure 1E:
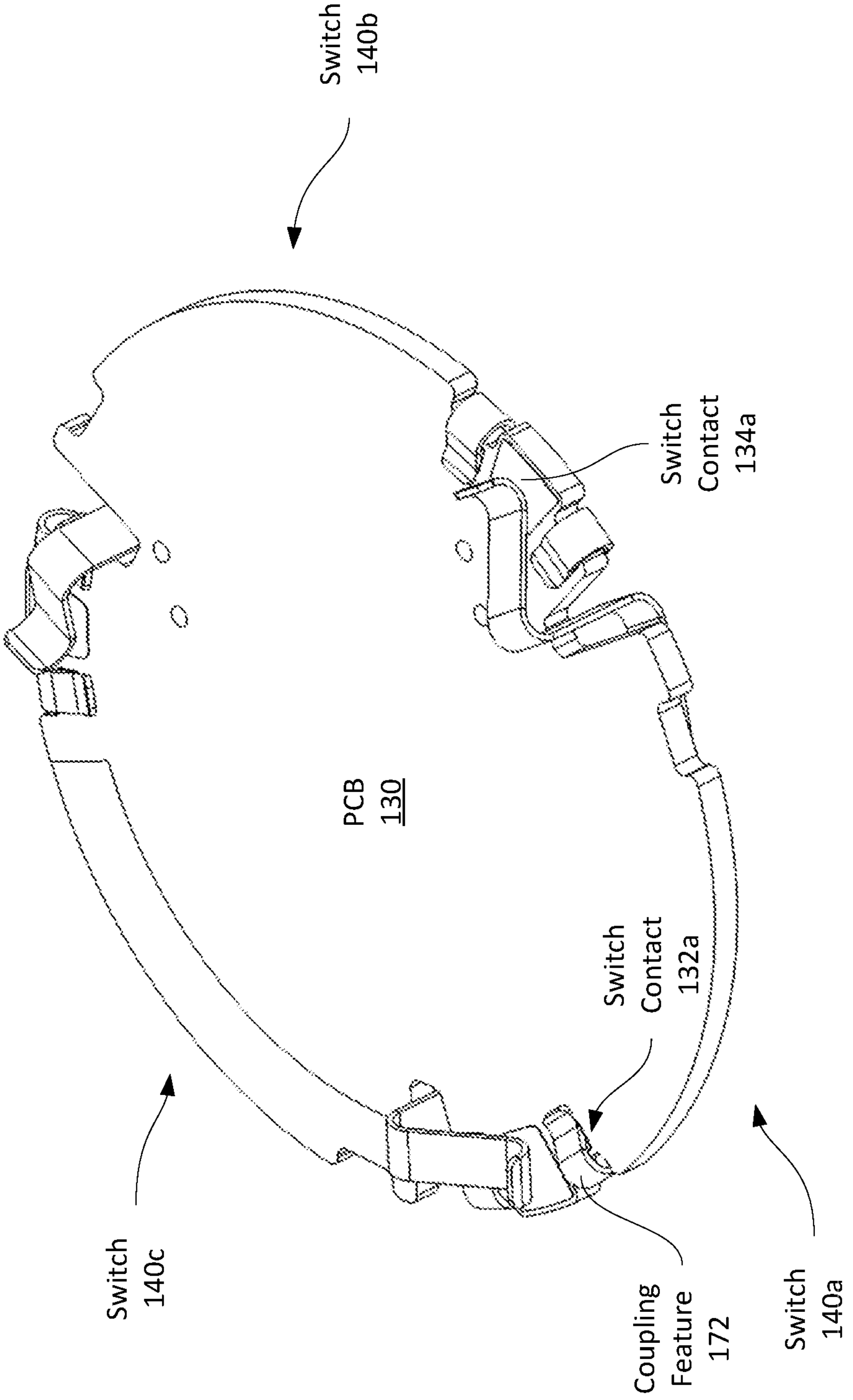
FIGS. 1E-1H show example switches for an electronic medication container cap.
Figure 1F:
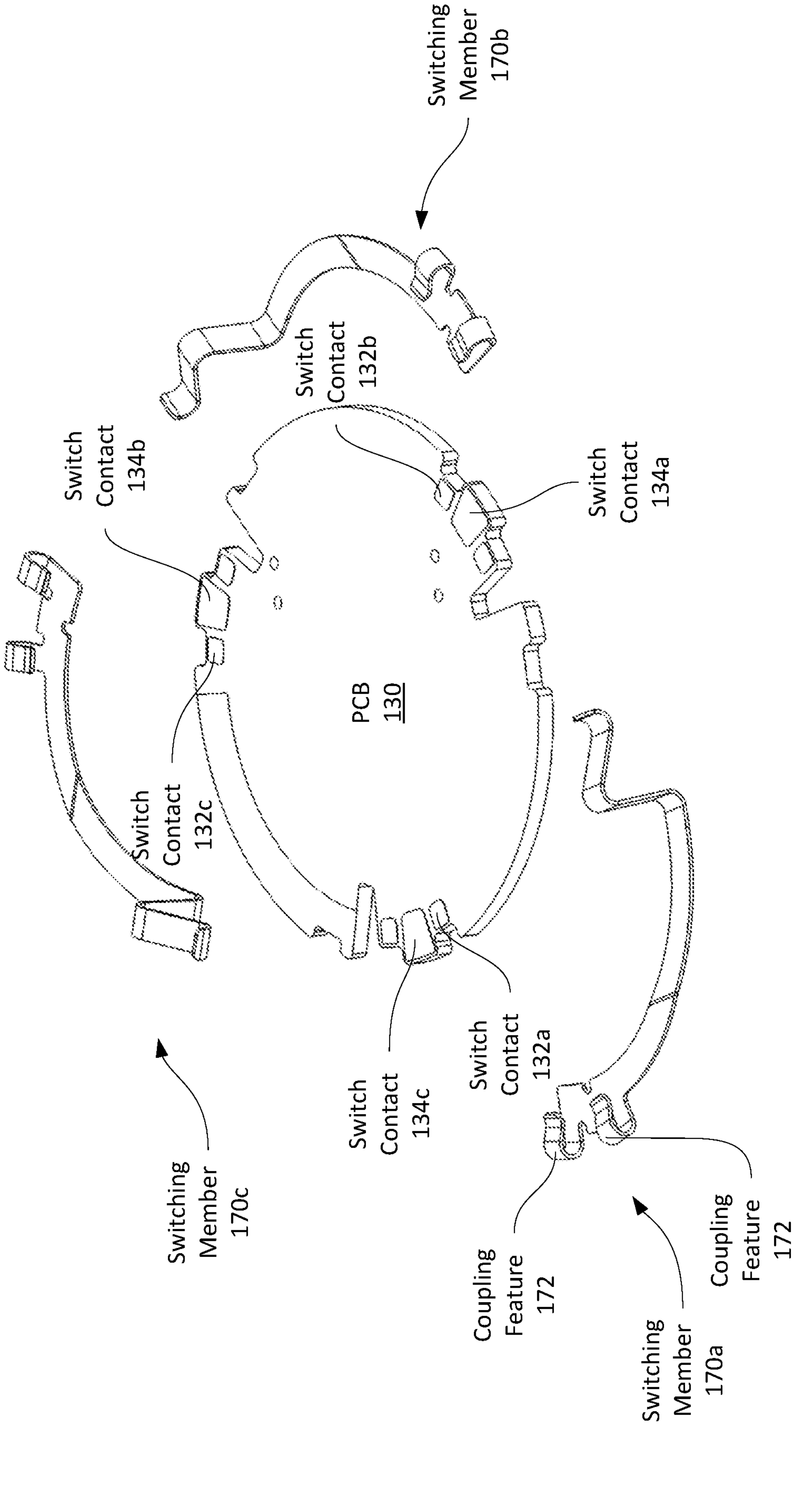

Referring now to FIGS. 1E and 1F, FIG. 1E shows the PCB 130 and switches 140*a-c* from FIG. 1B. FIG. 1E illustrates the "top" side of the PCB, which is the side of the PCB 130 that faces away from the storage portion 110 when the cap 120 is coupled to the storage portion 110, while the "bottom" side of the PCB faces the storage portion 110 when the cap 120 is engaged. Thus, the press plate 150 presses against the bottom portion of the PCB 130 when the cap 120 is coupled to the storage portion 110.

As can be seen, three switches 140*a-c* are provided in this example, though any suitable number of switches 140*a-c* may be employed. The switches 140*a-c* make and break connections between electrical contacts formed on the PCB 130. In this example, switch 140*a* makes or breaks contact between switch contact 133*a* (occluded by coupling feature 172 in FIG. 1E, but shown in FIG. 1F) and switch contact 134*a*. The corresponding switching member 170*a* (illustrated in FIG. 1F) is moved as described above with respect to FIG. 1B. Each switching member 170*a-c* is fixedly coupled at one end to the PCB 130 at a set of switch contacts 133*a-c* by a coupling feature 172, which in this example is a pair of clips; however any suitable coupling feature(s) may be used, including clips, clamps, solder, rivets, etc. The other end of the switching member 170*a* is free to move and contact another corresponding switch contact 134*a-c*. When the press plate 150 is pressed against the PCB 130 when the cap 120 is coupled to the storage portion 110, the switching members 170*a-c* deflect, causing the free end of each switching member 170*a-c* to be pushed away from a corresponding switch contact 134*a-c*, thereby opening the switch.

FIG. 1F shows an exploded view of the PCB 130 and switches 140*a-c*, which helps illustrate the components on the PCB 130 as well as the switching members 170*a-c*. As can be seen, three sets of electrical contacts are evenly positioned around the perimeter of the PCB 130. Each set of electrical contacts includes a pair of switch contacts 133*a-c* and one switch contact 134*a-c*. The pairs of switch contacts 133*a-c* each include two contact pads, but are electrically connected to each other on the PCB 130. For example, switch contact 133*a* has two contact pads that are electrically connected to each other. The two contact pads enable a high quality electrical connection between the switch contact 133*a* and coupling features 172 on switching member 170*a* that secure the switching member 170*a* to the PCB 130. Each switching member 170*a-c* is similarly coupled to the PCB at a corresponding switch contact 133*a-c*.

In addition, the coupling features 172 of each switching member 170*a-c* are separated from each other to allow the free end of an adjacent switching member 170*a-c* to settle onto the corresponding switch contact 134*a-c*. Thus, while switch contact 133*a* and switch contact 134*c* are physically adjacent to each other, they are parts of different switches 140*a-c* as can be seen in FIG. 1E. It should be appreciated that this arrangement of contacts is only one way to arrange the electrical contacts and switching members. Rather than using the split coupling features 172, in some examples, the switching members may have a single coupling feature 172, or closely spaced coupling features, corresponding to similarly spaced electrical contacts 133*a-c*, while the switch contact 134*a-c* is not positioned between such contacts. This would eliminate physical overlap of the switching members 170*a-c*. and may be desirable in some situations, such as to prevent inadvertent electrical connections being made between adjacent switches 140*a-c*. Further, while three switches 140*a-c* are illustrated in FIGS. 1E and 1F, Similar arrangements of switches may be made with any suitable number of switch members and corresponding switch contacts.

Figure 1G:
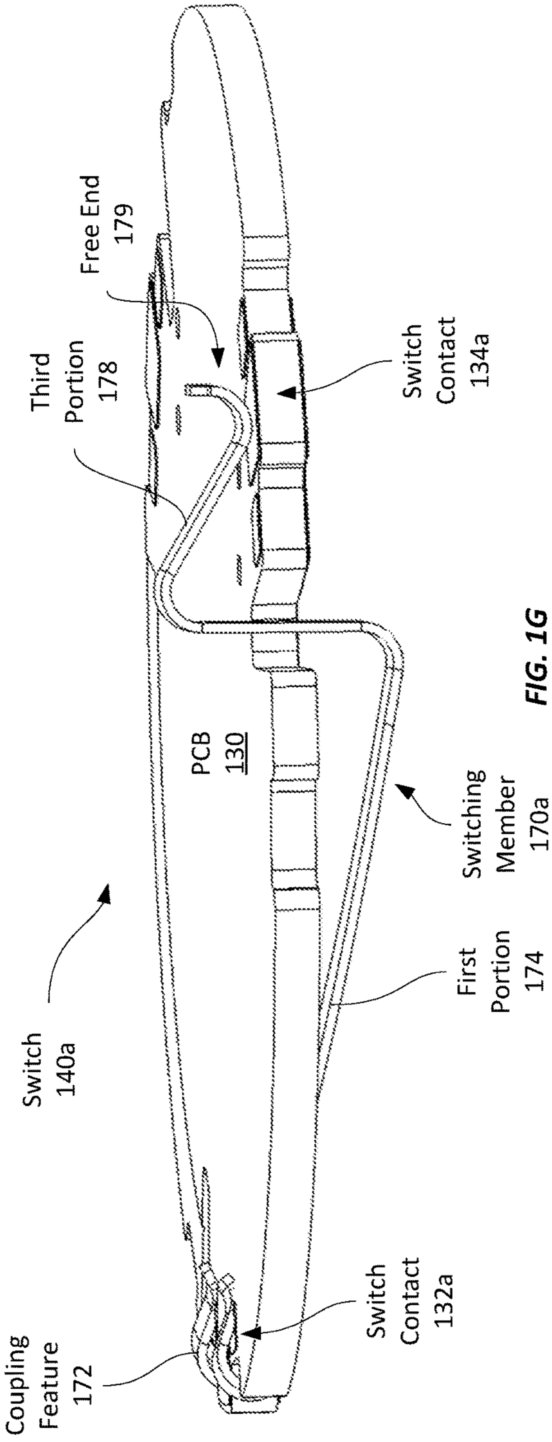
Figure 1H:
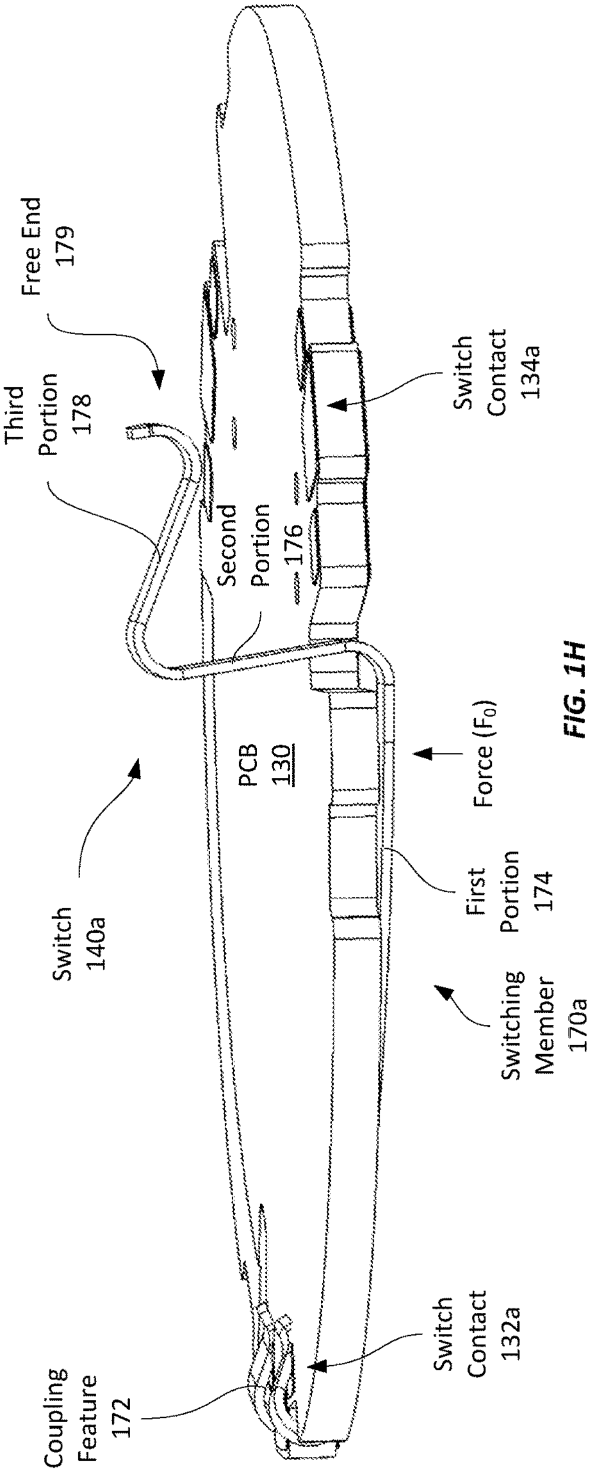

Referring now to FIGS. 1G and 1H, these figures illustrate switch 140*a* in the closed and open positions, respectively. In FIG. 1G, switch 140*a* is depicted as being closed. Switching member 170*a* is physically coupled to the PCB 130 and switch contacts 133*a* by coupling features 172. Thus, the switching member 170*a* is also electrically coupled to switch contacts 133*a*. In addition, the free end 179 of the switching member 170*a* is resting in contact with switch contact 134*a*.

The free end 179 of the switching member is held in place by a physical bias applied to the switching member 170*a*, which is in a rest position. This physical bias is typically the result of stored elastic energy in switching member 170*a*. The rest position occurs when the switching member 170*a* is allowed to return to a state with as little bias or stored elastic energy as allowed by the configuration, e.g., by removing a force applied by another component such as by the press-plate 150. In this example, the first portion 174 of the switching member 170*a* extends from the coupling features, while a second portion 176 extends through an opening in the PCB 130, and a third portion 178 angles back towards the PCB at the free end 179. The shape of the coupling feature 172 and the first portion 174 create an angle that biases the switching member away from the bottom surface of the PCB 130; however, because the third portion 178 is positioned adjacent to the top surface of the PCB 130, it is also biased in the same direction, but is obstructed by the top surface of the PCB 130. This biasing force holds the free end 179 of the switching member against the PCB 130 and the switch contact 134, Because the switching member 170 is constructed of a conductive material, such as steel or another metal, the switching member electrically connects switch contact 133*a* and switch contact 133B, thereby closing the switch.

In FIG. 1H, the same switch 140*a* has been opened. While not depicted in this figure, when the press plate 150 is pressed against the PCB 130 such as in response to the cap 120 being screwed onto the storage portion 110, it also presses against the first portion 174 of the switching member 170*a*, which deflects the switching member 170*a* towards the PCB. This causes the free end 179 of the switching member 170*a* to lift away from switch contact 134*a*, eliminating the electrical connection between the switching member 170*a* and switch contact 134*a*, thereby opening the switch 140. It should be appreciated that by deflecting the switching member 170*a* as shown in FIG. 1H, the biasing force exerted by the deformation of the coupling features 172 and the first portion 174 of the switching member 170*a* is increased. Thus, when the cap 120 is removed from the storage portion, the biasing force pushes the press plate 150 away from the PCB 130, allowing the free end 179 of the switching member to return to a rest position in contact with the switch contact 134*a*, thereby closing the switch as shown in FIG. 1G. When the switch is closed, the switching member 170*a* provides an electrical connection between switch contact 133*a* and switch contact 134*a*. As will be discussed in more detail below with respect to FIGS. 5-7, closing the switch may provide an electrical signal to the timer 180, such as a discrete timing circuit or to a processor, such as a microcontroller, that implements timing functionality.

Figure 2:
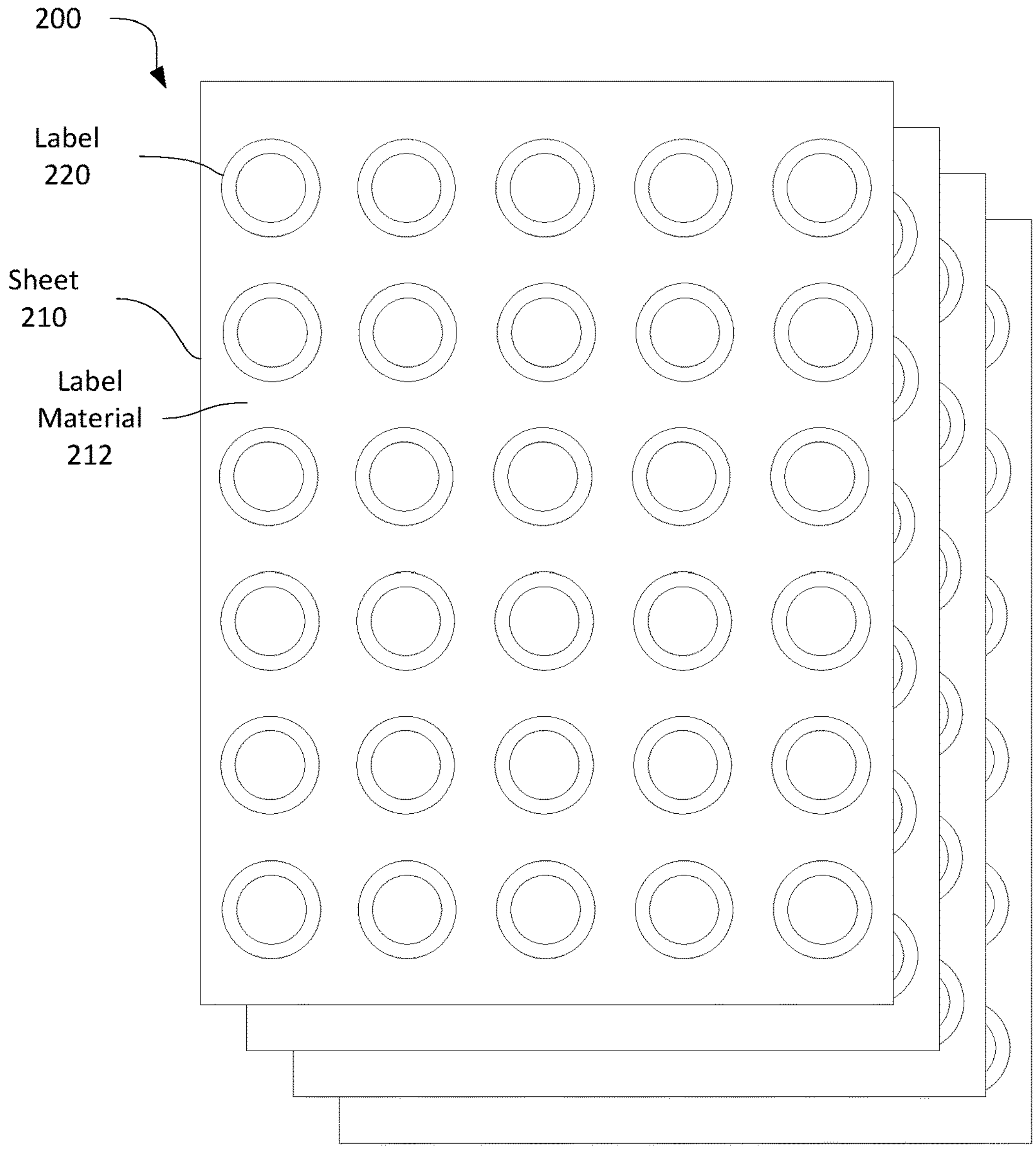
FIGS. 2 and 3 show example dosing labels for electronic medication caps.

Referring now to FIG. 2, FIG. 2 illustrates a stack of sheets 200 of labels for electronic medication container caps. As mentioned previously, labels for electronic medication caps may be created at the time a prescription is filled by a pharmacist, at the time of manufacture or bottling by a pharmaceutical company, etc. To enable such an entity to create labels as needed, labels may be created in computer software, e.g., by adding one or more indicators, medication and dose information, etc., and then printing information onto labels defined on a sheet of material, such as shown in FIG. 2.

Each sheet 210 in the stack of sheets 200 has a number of labels 220 defined on it. In this example, each sheet 210 has plastic decal material adhered to a backing material with a PSA applied to the plastic decal material 212. The labels 220 are precut from the decal material so they may be peeled away from the sheet 210 and affixed onto a cap. By using sheets 210, the pharmacist (or other entity) can load a stack of sheets 200 into a conventional printer, e.g., a laser printer, and print the material onto one or more labels on the sheet 210. Thus, there is no need for special-purpose printing equipment. Alternatively, sheets of such labels may be provided by a pharmaceutical company with pre-printed dosing information and indicators to allow the labels to be peeled away from the sheet and applied to a corresponding cap at the time the prescription is filled.

Figure 3:
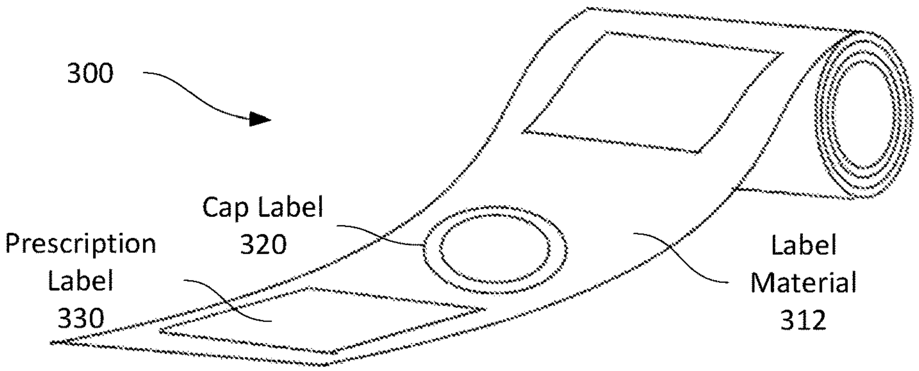

Referring now to FIG. 3, FIG. 3 shows an example reel 300 of cap labels 320 suitable for use with various examples according to this disclosure. The reel 300 in this example includes a label material 312 adhered to a backing material, similar to the example discussed above with respect to FIG. 2. Cap labels 320 and prescription labels 330 have been cut from the label material 312 and may be fed through a printer to have markers printed onto the cap labels 320 and prescription information printed onto the prescription labels 330. Each prescription label 320 on the reel has a corresponding cap label 320. Thus, when printing a cap label 320, the corresponding prescription label may be printed and both may be applied to the same medication container. Printing them on the same reel may help ensure that cap labels 320 or prescription labels 330 are not inadvertently applied to the wrong medication containers.

While medication containers may be fungible and used to store any medication, more specific information may be applied to such a medication container when medication is dispensed into it. For example, when a person provides a prescription to a pharmacist, the pharmacist may retrieve a blank storage portion from a supply of them, and count out a number of tablets based on the prescription. The pharmacist may also obtain a cap for the medication container and fill and close the medication container with the cap. As discussed above, caps include timers that can be configured with various time thresholds to cause visual indicators on the cap to activate as the thresholds are met. As more time passes, more thresholds are met, and more visual indicators are activated, either in response to a button press or continuously, by the timer. But for ease of manufacture, timers may be configured with fixed thresholds. Thus, rather than programming a timer, the pharmacist may select a cap that has a timer with a suitable program for the medication.

In this example, the pharmacy maintains a supply of caps that support a number of different dosing intervals, generally as described above with respect to FIGS. 1C and 1D. This may reduce the opportunity for mistakes based on selecting the wrong cap. However, in some examples, the pharmacy may have a supply of caps with timers suitable for six-hour, eight-hour dosing intervals, twelve-hour dosing intervals, and 24-hour dosing intervals.

After obtaining a cap, the pharmacist may then create a cap label 320 and a prescription label 330 based on the prescription information for the medication. The cap label 320 may be generated such as by selecting indicators to use, e.g., a single indicator indicating the dosing time or multiple indicators to establish a dosing window. She may then print the cap label 320 and the prescription label 330 using a conventional laser, ink-jet or thermal printer using the reel 300 of labels. Once the labels 320, 33 have been printed, she may peel the cap label 320 from the backing material, align the alignment slots 125 with the alignment tabs 126 on the cap 120, and press the label into place, adhering it to the cap 120. She may then apply the prescription label 330 to the storage portion. The pharmacist may screw the cap 120 into place and provide the filled, labelled medication bottle 100 to the person.

Figure 4A:
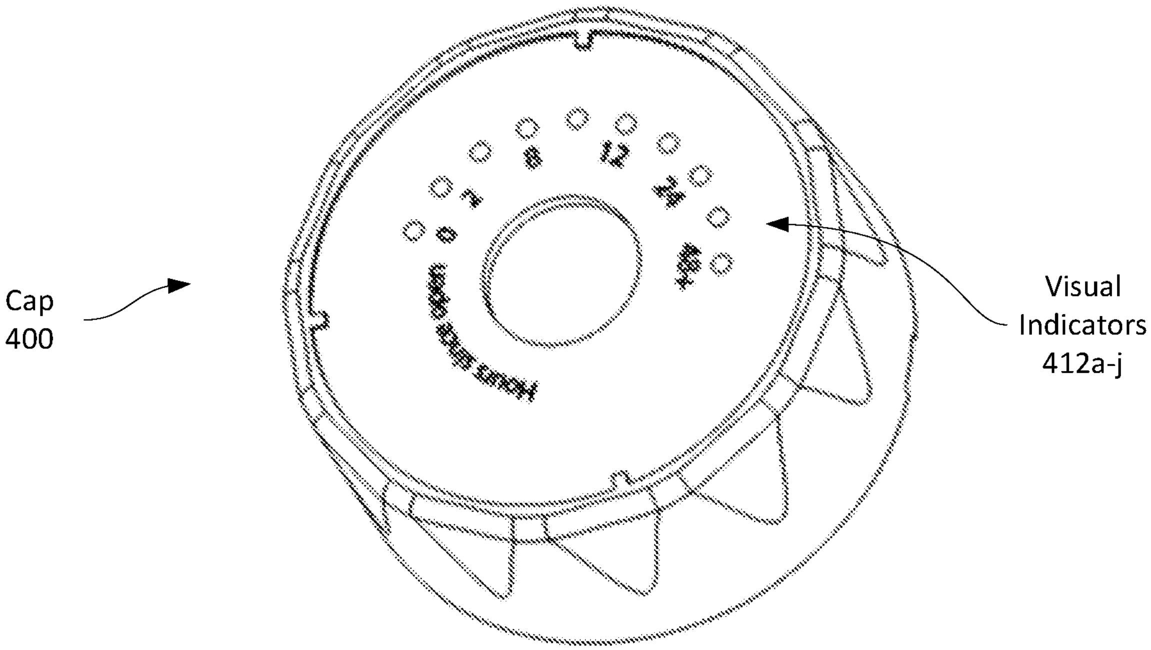
FIGS. 4A-4B show example dosing labels for electronic medication caps and FIGS. 5-6 show example methods for dosing labels for electronic medication container caps.
Figure 4B:
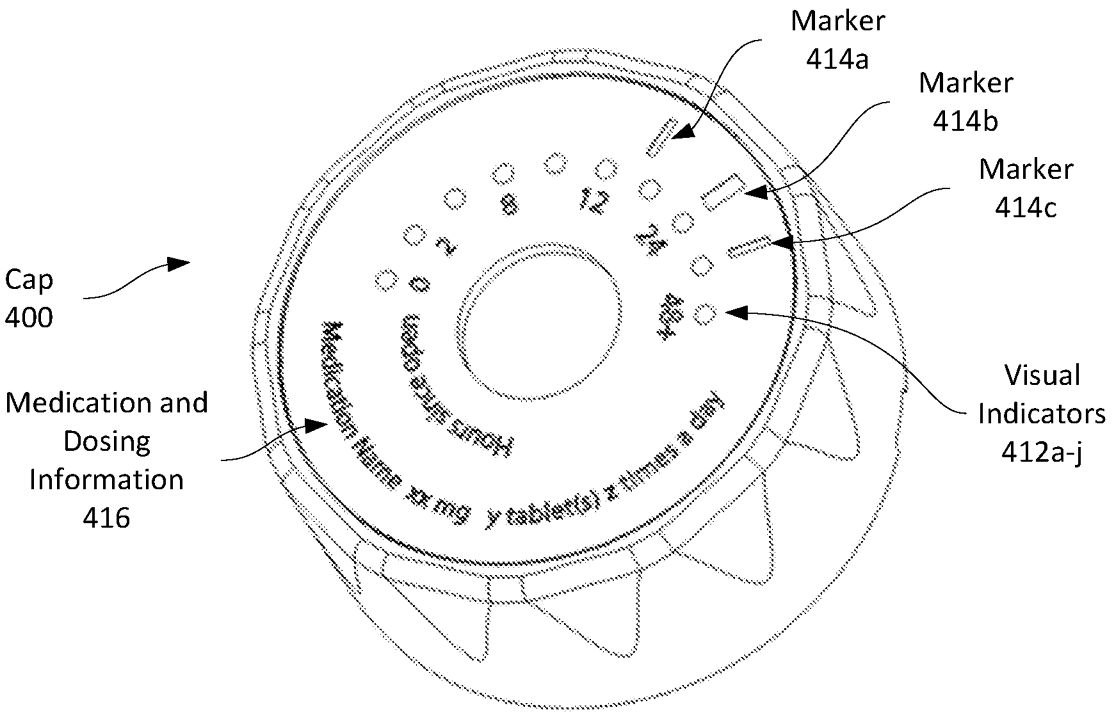

Referring now to FIGS. 4A-4B, FIG. 4A shows another example for providing dosing labels for electronic medication container caps. In this example, rather than separately printing a label, such as described above with respect to FIGS. 1C-1D and FIGS. 2-3, the dosing information and markers are printed directly on the cap itself. In this example, the cap 400 as shown in FIG. 4A has been provided with timing information corresponding to the visual indicators 412*a-j*, but without any medication and dosing information or markers. At a later time, a pharmacist or other medical professional may prepare an amount of medication to be dispensed into a storage portion of a medication bottle and may print medication and dosing information 416 directly onto the cap 400 itself, or one or the other of the medication and dosing information 416 or markers 414*a-c* may be printed on the cap while the others may be printed on a label.

Figure 5:
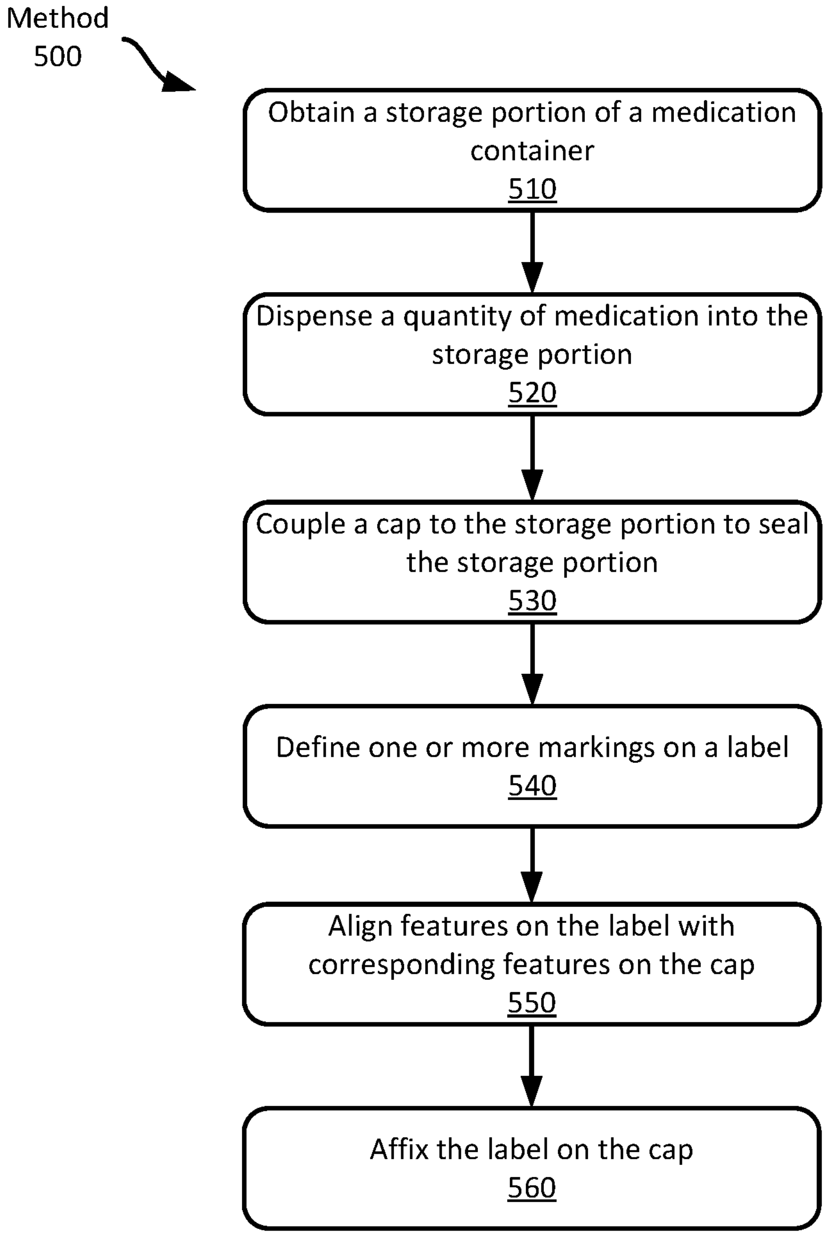

Referring now to FIG. 5, FIG. 5 shows an example method 500 for providing dosing labels for electronic medication container caps. The method 500 in FIG. 5 will be described with respect to the medication container shown in FIGS. 1A-1H; however it may be used with any suitable medication container and label according to this disclosure.

At block 510, a storage portion 110 of a medication container is obtained. In a pharmacy setting, a pharmacist may obtain a storage portion 110 of a medication container by accessing a supply of suitable storage portions 110 for the medication to be dispensed to a customer. In an automated bottling setting, storage portions 110 may be loaded into bottling machine, which may then release them into an assembly line for filling.

At block 520, a quantity to medication tablets is dispensed into the storage portion 110. For example, a pharmacist may review a prescription for the customer to determine a type and quantity of tablets to dispense into the storage portion 110. She then counts out and dispenses the medication tablets into the storage portion 110. In an automated bottling setting, a bottling machine may be pre-programmed with a predetermined number of tablets to automatically dispense into the storage portion 110. As mentioned above, the term "tablets" is being used generally to refer to capsules, pills, tablets, etc. of medication.

At block 530, a cap 120 is coupled to the storage portion 110 to seal the storage portion 110. In this example, after dispensing the medication tablets into the storage portion 110, the pharmacist obtains a cap 120 and couples it to the storage portion 110.

In an automated bottling setting, a bottling machine may be pre-loaded with a number of caps corresponding to the medication to be dispensed by the bottling machine. As storage portions 110 are moved through the machine and filled with quantities of medication at block 520, a cap 120 may be coupled to the storage portion at a particular station within the machine.

At block 540, one or more marks 124*a-c* are defined on a label 123. In this example, the pharmacist obtains a reel 300 of labels 123. The reel 300 of labels 123 has a backing material with a number of labels formed from a flexible, pre-cut, plastic decal material affixed to it. She loads the reel 300 of labels 123 into a printer, such as an ink-jet, laser or thermal printer, and accesses computer software to select a suitable configuration of markers 124*a-c* to define on sdfthe label. In this example, she selects a pre-configured template of markers 124*a-c* that include an marker 124*b* corresponding to the dosing time, and one marker 124*a*, which indicates the beginning of a dosing window, to one side of marker 124*b*, and another marker 124*c*, which indicates the end of the dosing window. She then prints the markers 124*a-c* onto the labels to define the markers 124*a-c*. In addition in this example, as described above, the reel 300 also includes prescription labels 310, which may be printed at the same time as the corresponding label 320.

Rather than use predefined label indicators, the pharmacist may instead define such markings using computer software or my manually applying markings to the label. For example, the pharmacist may access software, similar to the software discussed above with predefined labels with indicators, and may adjust existing indicators, create new indicators, or delete existing indicators to customize the indicators on the label. She may then print the indicators on a label as discussed above.

In some examples, rather than providing blank rolls 300 of labels, a manufacturer may define markers on the labels at the time they are manufactured. For example, the manufacturer may pre-print markers on different sets of labels, e.g., with standard markers for 8-hour, 12-hour, or 24-hour dosing intervals, or it may define markers by cutting out portions of the label, such as to define shapes like lines, arrows, brackets, etc. to indicate dosing times or dosing windows. In such an example, the pharmacist or automated bottling system may simply access the labels with the pre-defined indicators.

At block 550, the alignment features on the label are aligned with the alignment features on the cap. In this example, the pharmacist peels the label away from the backing material and aligns the alignment slots 125 formed into the label 123 with corresponding alignment tabs 126 on the cap 120. As discussed above, some caps 120 may have different configurations of alignment features, e.g., alignment tabs 126 to ensure only specific labels, e.g., labels with certain predefined markers 124*a-c*, will properly align with the alignment features on the cap 120. In an automated bottling setting, the caps and labels should be pre-selected to have corresponding alignment features to enable the bottling machine to properly align the labels and caps.

It should be appreciated that in some examples, labels and caps may not have alignment features. Instead, alignment may be performed based on the locations of the visual indicators 122*a-j* on the cap and the markers 124*a-c* on the label 123. Further, some example caps may have information printed, e.g., embossed, on the cap to identify a particular visual indicator, such as "8 HR" embossed adjacent to one of the indicators that corresponds to an eight-hour threshold programmed into the timer. The pharmacist could then us the embossed descriptor to align markers 124*a-c* on the label with the visual indicators 122*a-j*.

At block 560, the label 123 is affixed to the cap 120. In this example, a PSA on opposite side of the label 123 from the markers 124*a-c* is used to adhere the label to the cap 120. However, in some examples, the label 123 may be laid on the cap 120 and held in place by one or more tabs or a transparent cover may be overlaid onto the label 123 and cap 120 and snap-fit, adhered, or heat-welded into place.

The example method 500 described above has been described as occurring in a particular order; however, the steps of the method 500 may be re-ordered according to different examples. For example, the label 123 may be affixed to the cap 120 before the cap 120 is coupled to the storage portion 110. In some examples, the markers 124*a-c* on the label 123 may be defined before the medication tablets are dispensed in to the storage portion 110, and in some examples, one or more labels 123 may be manufactured with markers 124*a-c* pre-defined on them. Thus, in some examples, block 540 may be omitted by the person or entity performing the method 500.

Figure 6:
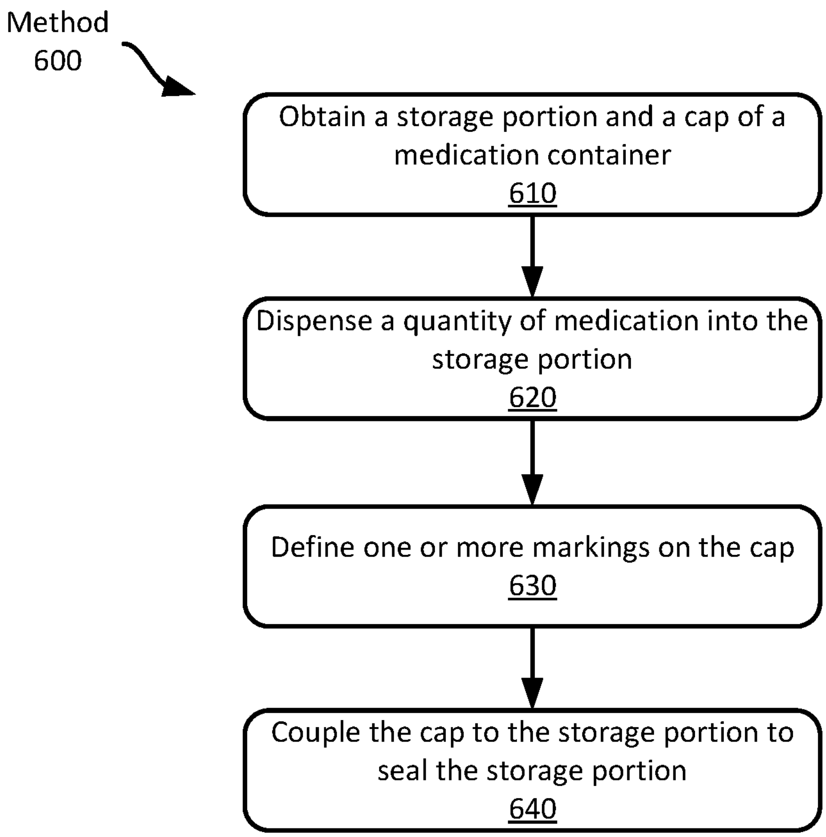

Referring now to FIG. 6, FIG. 6 shows an example method 600 for providing dosing labels for electronic medication container caps. The method 600 in FIG. 6 will be described with respect to the medication container shown in FIGS. 1A-1H and the cap shown in FIGS. 4A-4B; however it may be used with any suitable medication container according to this disclosure.

At block 610, a storage portion 110 and cap 400 of a medication container is obtained. In a pharmacy setting, a pharmacist may obtain a storage portion 110 and cap 400 of a medication container by accessing a supply of suitable storage portions 110 and cap 400 for the medication to be dispensed to a customer. In an automated bottling setting, storage portions 110 and caps 400 may be loaded into bottling machine, which may then release them into an assembly line for filling.

At block 620, a quantity to medication tablets is dispensed into the storage portion 110 generally as described above with respect to block 520 above.

At block 630, one or more markings are defined on the cap 400. In this example, in contrast to the example discussed above with respect to FIG. 5, the markings, such as markers 414*a-c* or medication and dosing information 416, are defined directly on the cap 400, rather than on a separate label. Thus, the cap may be inserted into a suitable printer to apply the defined markings. As discussed above with respect to block 540, the markings may be designed using any suitable technique, such as by selecting pre-defined markings for a particular medication or by custom-designing markings as needed using suitable software. The printer then applies the markings directly to the cap 400.

At block 640, the cap 400 is coupled to the storage portion 110 generally as described above with respect to block 530.

The example method 600 described above has been described as occurring in a particular order; however, the steps of the method 600 may be re-ordered according to different examples. For example, in some examples, the markers 414*a-c* may be defined before the medication tablets are dispensed into the storage portion 110, and in some examples, one or more caps 400 may be manufactured with markers 124*a-c* pre-defined on them. Thus, in some examples, block 630 may be omitted by the person or entity performing the method 600.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A medication container comprising:
- a storage portion enclosing a volume to store medication and having an opening providing access to the volume,
- a cap configured to releasably couple to and seal the storage portion, the cap comprising:
  - a plurality of visual indicators;
  - a sensor; and
  - an electronic timer,
- wherein:
  - the sensor is configured to output a signal in response to detecting that the cap is disengaged from the storage portion; and
  - the electronic timer is configured to reset based on the signal and to output one or more signals to activate one or more of the plurality of visual indicators based on an elapsed time since a most recent resetting of the electronic timer and one or more time thresholds; and
- wherein a plurality of markers are provided on the cap, each marker of the plurality of markers corresponding to one of the plurality of visual indicators, the markers indicating dosing times associated with a medication.

2. The medication container of claim 1, further comprising a label affixed to the cap, the plurality of markers defined on the label.

3. The medication container of claim 1, wherein the plurality of markers are defined directly on the cap.

4. The medication container of claim 1, where the cap further comprises a switch, the switch configured to toggle the plurality of visual indicators between an active state and an inactive state, wherein the plurality of visual indicators in the inactive state are turned off, and wherein the plurality of visual indicators in the active state are turned on based on the one or more signals output by the electronic timer.

5. The medication container of claim 4, wherein the switch is a button.

6. The medication container of claim 1, wherein the sensor comprises a switch positioned to be actuated based on coupling or decoupling the cap from the storage portion.

7. The medication container of claim 1, further comprising a plurality of medication tablets disposed within the storage portion.

8. The medication container of claim 7, wherein a first marker of the plurality of markers indicating a dosing time and a first threshold of the one or more thresholds corresponds to a dosing interval for the medication tablets.

9. The medication container of claim 8, wherein the plurality of markers comprises a second marker and a third marker, the second marker defined on one side of the first marker and the third marker defined on the other side of the first marker, the second and third markers defining a dosing window.

10. The medication container of claim 9, wherein:

a first threshold of the one or more thresholds corresponds to a beginning of a dosing window for the medication tablets;

a second threshold of the one or more thresholds corresponds to a dosing interval for the medication tablets; and a third threshold of the one or more thresholds corresponds to an end of the dosing window for the medication tablets;

the electronic timer is configured to:

output a first signal to activate a first visual indicator of the plurality of visual indicators based on the elapsed time exceeding the first threshold, the first visual indicator aligned with the second marker;

output a second signal to activate a second visual indicator of the plurality of visual indicators based on the elapsed time exceeding the second threshold, the second visual indicator aligned with the first marker; and output a third signal to activate a third visual indicator of the plurality of visual indicators based on the elapsed time exceeding the third threshold, the third visual indicator aligned with the third marker.

11. A cap for a medication container, the cap comprising:

a plurality of visual indicators;

a sensor; and an electronic timer, wherein:

the sensor is configured to detect the cap disengaging from a storage portion and to transmit a signal to the electronic timer, and the electronic timer is configured to reset based on the signal and to output a signal to activate one or more of the plurality of visual indicators based on an elapsed time since a most recent resetting of the electronic timer and one or more time thresholds; and a plurality of markers, each marker a of the plurality of markers corresponding to a visual indicator of the plurality of visual indicators to indicate a corresponding medication dosing time.

12. The cap of claim 11, further comprising a label affixed to the cap, the plurality of markers defined on the label.

13. The cap of claim 11, wherein the plurality of markers are defined directly on the cap.

14. The cap of claim 11, wherein a first threshold of the one or more thresholds corresponds to a dosing interval.

15. The cap of claim 14, wherein the plurality of markers comprises a second marker and a third marker, the second marker defined on one side of a first marker and the third marker defined on the other side of the first marker, the second and third markers defining a dosing window.

16. The cap of claim 15, wherein:

a first threshold of the one or more thresholds corresponds to a beginning of a dosing window;

a second threshold of the one or more thresholds corresponds to a dosing interval; and a third threshold of the one or more thresholds corresponds to an end of the dosing window;

the electronic timer is configured to:

output a first signal to activate a first visual indicator of the plurality of visual indicators based on the elapsed time exceeding the first threshold, the first visual indicator aligned with the second marker;

output a second signal to activate a second visual indicator of the plurality of visual indicators based on the elapsed time exceeding the second threshold, the second visual indicator aligned with the first marker; and output a third signal to activate a third visual indicator of the plurality of visual indicators based on the elapsed time exceeding the third threshold, the third visual indicator aligned with the third marker.

17. A method of dispensing medication, comprising:

obtaining a storage portion of a medication container, the storage portion enclosing a volume to store medication and having an opening providing access to the volume;

dispensing a quantity of medication tablets into the storage portion;

coupling a cap to the storage portion to seal the storage portion, the cap comprising:

a plurality of visual indicators;

a sensor; and a timer configured to output one or more signals to activate one or more visual indicators of the plurality of visual indicators based on an elapsed time since a most recent resetting of the timer and one or more time thresholds;

the sensor configured to output a signal in response to detecting the cap is disengaged from the storage portion, the timer further configured to reset based on the signal;

aligning one or more alignment slots on a label with corresponding one or more alignment tabs on the cap, the label having a plurality of markers; and affixing the label on the cap.

18. The method of claim 17, further comprising defining the plurality of markers on the label, the plurality of markers corresponding to the plurality of visual indicators, the markers indicating dosing times associated with the quantity of medication.

19. The method of claim 17, wherein defining the plurality of markers on the label comprises printing the markers on the label.

20. The method of claim 17, wherein the label is initially affixed to a backing material by an adhesive, and the method further comprises removing the label from the backing material.

21. The method of claim 20, wherein the backing material is a reel of backing material and the label is one of a plurality of labels affixed to the reel of backing material, and wherein defining the plurality of markers on the label comprises printing the plurality of visual indicators on the label using a printer, wherein the printer receives the reel of backing material and plurality of labels for printing.

22. The method of claim 17, further comprising decoupling the cap from the storage portion and resetting the timer.

23. The method of claim 17, wherein a first marker of the plurality of markers indicating a dosing time and a first threshold of the one or more thresholds corresponds to a dosing interval for the medication.

24. The method of claim 23, wherein the label further comprises a second marker and a third marker, the second marker defined on one side of the first marker and the third marker defined on the other side of the first marker, the second and third markers defining a dosing window.

25. The method of claim 24, wherein:

a first threshold of the one or more thresholds corresponds to a beginning of a dosing window for the medication;

a second threshold of the one or more thresholds corresponds to a dosing interval for the medication; and a third threshold of the one or more thresholds corresponds to an end of the dosing window for the medication, the method further comprising:

illuminating a first visual indicator of the plurality of visual indicators based on the elapsed time exceeding the first threshold, the first visual indicator aligned with the second marker;

illuminating a second visual indicator of the plurality of visual indicators based on the elapsed time exceeding the second threshold, the second visual indicator aligned with the first marker; and illuminating a third visual indicator of the plurality of visual indicators based on the elapsed time exceeding the third threshold, the third visual indicator aligned with the third marker.

* * * * *